L. TILLINGHAST.
Manufacture of Horn and Shell Goods.

No. 225,247. Patented Mar. 9, 1880.

Witnesses.
Edward Card
H. W. Hubbard

Inventor.
Leonard Tillinghast

UNITED STATES PATENT OFFICE.

LEONARD TILLINGHAST, OF PROVIDENCE, RHODE ISLAND.

MANUFACTURE OF HORN AND SHELL GOODS.

SPECIFICATION forming part of Letters Patent No. 225,247, dated March 9, 1880.

Application filed January 31, 1880.

*To all whom it may concern:*

Be it known that I, LEONARD TILLINGHAST, of Providence, in the State of Rhode Island, have invented an Improvement in the Manufacture of Horn and Shell Goods, of which the following is a specification.

The nature of my invention consists in the double flexure of plates of horn or shell by means of two or more grooves cut at the angular points of deflection, so as to present variously-inclined plane surfaces, producing a raised or rolled angular appearance.

It also consists in a lip angularly thrown up from an opening in a plate of horn or shell by means of a groove cut across the base of the lip.

Figure 1:
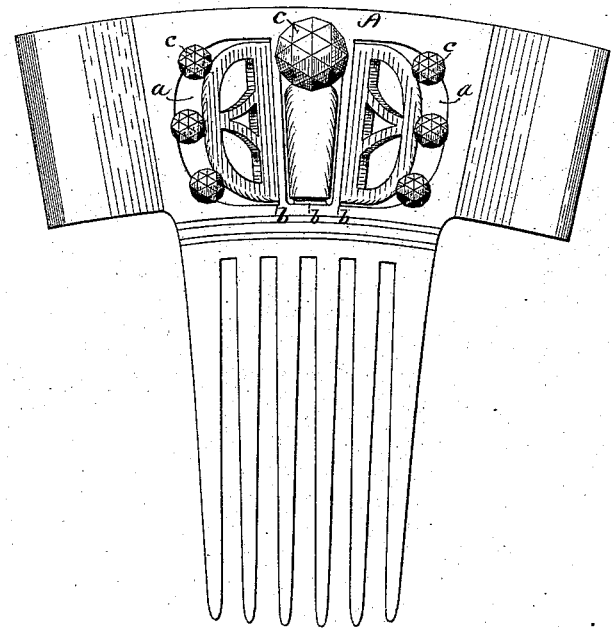
Figure 2:
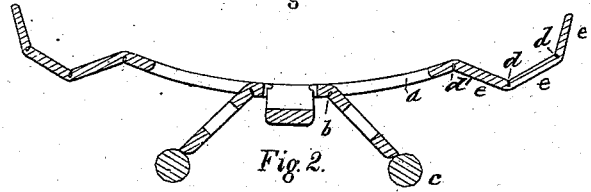
Figure 3:
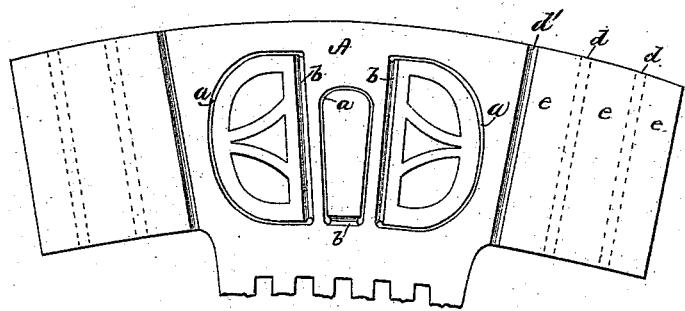

Figure 1 is an elevation of the finished comb made of horn or shell. Fig. 2 represents a section taken across the middle of the upper portion of the comb. Fig. 3 is a partial elevation, showing the plate in its original flattened condition, cut and grooved previous to its deflection.

In the manufacture of ornamental combs and other articles from horn or shell the brittleness of the material has heretofore prevented a direct angular bending, so that the outward bending of the open-work in such articles has hitherto been in gradual curves. I have, however, been able to produce highly desirable effects by making a curved slot or opening, $a$, in the plate A, and joining the ends of the slot by a groove, $b$, cut partially through the plate, which will serve to permit the heated horn or shell to be deflected at an angle with the surface of the plate A, to receive the ornamental knobs or balls $c$ $c$. The resulting desirable appearance cannot be produced by a gradually-curving bend, as heretofore, and the material at its original proper thickness is too brittle to be bent at an angle without the prior formation of the groove $b$, joining the ends of the curved slot $a$.

Desirable effects are also produced by cutting two or more grooves, $d$ $d$, and deflecting the plain surfaces $e$ $e$ at an angle, as shown in section, Fig. 2, thus producing a raised angular appearance; or the grooves $d$ $d$ may be cut on the same side of the plate, producing an angular rolled effect.

These improvements are applicable to various articles of ornament made of horn or shell or similar brittle material.

I claim as my invention—

1. In horn or shell goods, the combination of two or more grooves, $b$ $b$, with the adjoining angularly-deflected surfaces $e$ $e$, substantially as described.

2. In horn or shell goods, the combination of the grooves $b'$ and $b$, upon opposite sides of the plate, with the adjoining angularly-deflected surfaces $e$ $e$, substantially as described.

3. In horn or shell goods, the combination of a slot or opening, $a$, with the groove $b$, for the purpose of angular deflection, substantially as described.

LEONARD TILLINGHAST.

Witnesses:
HARMON S. BABCOCK,
EDWARD CARD.